(12) United States Patent
Fiedler

(10) Patent No.: US 12,484,999 B2
(45) Date of Patent: Dec. 2, 2025

(54) ORTHOPEDIC IMPACTOR AND EXTRACTOR DEVICE

(71) Applicant: Limacorporate S.p.A., San Daniele del Friuli (IT)

(72) Inventor: Christoph Fiedler, Diekhof (DE)

(73) Assignee: LIMACORPORATE S.P.A., Udine (IT)

( * ) Notice: Subject to any disclaimer, the term of this patent is extended or adjusted under 35 U.S.C. 154(b) by 0 days.

(21) Appl. No.: 18/571,715

(22) PCT Filed: Apr. 28, 2023

(86) PCT No.: PCT/EP2023/061282
§ 371 (c)(1),
(2) Date: Dec. 18, 2023

(87) PCT Pub. No.: WO2023/209171
PCT Pub. Date: Nov. 2, 2023

(65) Prior Publication Data
US 2025/0073012 A1   Mar. 6, 2025

(30) Foreign Application Priority Data
Apr. 29, 2022   (IT) .......................... 102022000008687

(51) Int. Cl.
*A61F 2/00*   (2006.01)
*A61F 2/46*   (2006.01)

(52) U.S. Cl.
CPC ........ *A61F 2/00* (2013.01); *A61F 2002/4619* (2013.01); *A61F 2002/4627* (2013.01); *A61F 2002/4681* (2013.01)

(58) Field of Classification Search
CPC .............. A61F 2/461; A61F 2002/4627; A61F 2002/4628
See application file for complete search history.

(56) References Cited

U.S. PATENT DOCUMENTS

2005/0124998 A1*   6/2005   Coon ...................... A61F 2/461
606/99
2006/0200162 A1*   9/2006   Farling ................ A61B 17/157
606/88

(Continued)

OTHER PUBLICATIONS

International Search Report dated Jun. 12, 2023 issued in connection with PCT/EP2023/061282.

(Continued)

*Primary Examiner* — Matthew J Lawson
(74) *Attorney, Agent, or Firm* — Eversheds Sutherland (US) LLP

(57) ABSTRACT

The present invention relates to an orthopedic impactor and extractor device (1) for an orthopaedic prosthesis (100), comprising a main body (2), a coupling rod (3) comprising a coupling end (7), an activation system (4) in the main body (2). The activation system (4) is associated with the coupling rod (3). The coupling end (7) is movably guided from an active position, in which the coupling end (7) is coupled to the orthopaedic prosthesis (100), to an inactive position, in which the coupling end (7) releases the orthopaedic prosthesis (100); and wherein the coupling end (7) is movably guided in a roto-translation movement between the active position and the inactive position, and vice versa. The present invention also relates to a related orthopedic impactor and extractor kit.

13 Claims, 9 Drawing Sheets

(56) References Cited

U.S. PATENT DOCUMENTS

| | | |
|---|---|---|
| 2010/0076438 A1 | 3/2010 | Correia et al. |
| 2012/0143204 A1* | 6/2012 | Blaylock .............. A61F 2/461 623/20.35 |
| 2013/0018382 A1* | 1/2013 | Jones ................ A61F 2/4603 623/20.35 |
| 2023/0120086 A1* | 4/2023 | Gosik-Wolfe ....... A61B 17/92 606/207 |

OTHER PUBLICATIONS

Written Opinion dated Jun. 12, 2023 issued in connection with PCT/EP2023/061282.

* cited by examiner

ORTHOPEDIC IMPACTOR AND EXTRACTOR DEVICE

CROSS-REFERENCE TO RELATED APPLICATIONS

This application is a national phase of PCT/EP2023/061282, filed Apr. 28, 2023, and claims priority to Italian Patent Application No. 102022000008687, filed Apr. 29, 2022, the entire contents of both of which are hereby incorporated by reference.

FIELD OF APPLICATION

The present invention relates to an orthopedic impactor and extractor, used for the application and removal of prosthetic components.

The present invention finds application, particularly but not limitedly, in orthopedic operations involving the precise positioning of a femoral prosthesis or "femoral component", or a so-called "trial component", onto a femur. More particularly, this femoral prosthesis is intended for the distal portion of the femur, i.e. at the knee.

PRIOR ART

The field in which the present invention can be placed is that of surgical operations, mainly those intended for the grafting of a joint insert, called femoral component, close to a femoral end near the tibia, as well as downstream of a preparation phase of the related seat.

Devices called impactors are nowadays used for femoral component grafting, whereby the femoral component is hooked, brought toward its designated site, and grafted by applying force onto the impactor, often by striking the impactor by a hammer.

Furthermore, since femoral components of various sizes are present, spacers or adapters applied between the impactor and the femoral component are often used, which are conjugated or in any case replicate the shape of the femoral component "in negative".

Once the prosthetic component has been grafted, the impactor can be disengaged and removed.

During the grafting phase, the femoral component must be stable and tightly connected to the impactor.

In order to obtain a reliable coupling, the impactors generally use a pincer mechanism, with two arms hinged to each other which grip the femoral component in a pincer movement on its outer surface and are then spread and decoupled once the femoral component has been grafted.

Though this solution is reliable and ensures both the correct coupling with the femoral component and the resistance of said coupling in the abutting phase of the hammer onto the impactor, it has the drawback of requesting an action space which is much larger than the size of the femoral component.

In the requested applications, in which the maneuvering spaces for the surgeon are narrow, this amount of space, dictated by the movement of the pincers, is not practical and requires complex compensation operations.

Therefore it is a technical problem underlying the present invention that of overcoming the above-mentioned drawbacks of the prior art.

Specifically, an object is to provide a device that allows creating a stable connection with the femoral component but at the same time reducing the overall dimensions dictated by the presence of the device itself.

An object of the invention is also to provide a device that is intuitive to use, namely without requiring particular additional skills or a long apprenticeship for a surgeon who has to adopt it.

A further object of the invention is to provide a device that always ensures the surgical operation safety for the patient.

Finally, an object of the invention is to provide a device including technical solutions that are simple to implement from a production point of view.

SUMMARY OF THE INVENTION

The solution idea underlying the present invention is to provide a device that allows coupling, retaining, and also releasing the orthopaedic prosthesis during the operational phases of the implantation thereof, hooking it in a position that is substantially in axial extension of the device instead of by means of a grip on a lateral surface.

The above technical problem is solved by an orthopedic impactor and extractor device for an orthopaedic prosthesis, comprising a main body, a coupling rod comprising a coupling end and an activation system in the main body, associated with the coupling rod; the coupling end being movably guided from an active position, in which it is coupled to the orthopaedic prosthesis, to an inactive position, in which it releases the orthopaedic prosthesis; the coupling end is also movably guided in a roto-translation movement between the active position and the inactive position and vice versa.

Advantageously, the present invention allows exploiting a different hooking point to the orthopaedic prosthesis compared to the known devices, thus minimizing the amount of space required during the grafting of the prosthesis itself.

Further advantageously, the roto-translation movement allows obtaining a stable coupling between prosthesis and impactor, thus minimizing the action necessary for the coupling end.

Preferably, the coupling end is adapted to rotate between the inactive position and the active position.

Preferably, the coupling end comprises a laterally projecting portion, which is particularly L-shaped.

Advantageously, this shape allows using the coupling end as end stroke abutment for the prosthesis, thus avoiding a longitudinal sliding.

According to a preferred embodiment, the activation system comprises a push rod, a slide portion connected and coaxial to the push rod, an end rod connected and coaxial to the slide portion and wrapped in a spring member and a lever tool.

Advantageously, an activation system thus constituted requires a single movement by the surgeon for the activation of the impactor.

Preferably, the lever tool comprises a force lever and a leaf spring, connected to the force lever and sliding in the slide portion.

Advantageously this solution minimizes the number of components and creates sufficient force to activate the impactor relative to the force exerted by the surgeon.

Preferably, the coupling rod comprises a first helical groove at a lateral surface thereof, and the push rod comprises a first pin, adapted to slide along the first helical groove to guide a rotation of the coupling end.

Advantageously, therefore, the push generated by the operator by the lever allows a pin to slide in a groove, with a consequent roto-translation in a unique movement of the coupling end and consequent locking of the prosthesis. Likewise, a reverse movement easily allows decoupling the impactor.

Still preferably, the main body further comprises at least one second L-shaped groove and the coupling rod comprises a second pin, adapted to slide along the at least one second L-shaped groove to guide a longitudinal movement of the coupling end.

Advantageously, it is thus possible to control the longitudinal movement of the coupling rod and of the related coupling end inside a well-defined path.

Still preferably, the main body further comprises lateral recesses, in which the leaf spring is coupled to the slide portion by a first alignment pin and the push rod is coupled to the slide portion by a second alignment pin, the first alignment pin and the second alignment pin being adapted to slide in the lateral recesses.

Advantageously, the connecting elements among the components of the activation system are used to also ensure a controlled and only transversal sliding of the coupling rod.

Preferably, the main body is composed of a longitudinally partially grooved beam comprising a longitudinal housing channel for the activation system.

Advantageously, this substantially hull structure allows for a structurally robust overall device, an easier aggregation of the components and a simple construction from a production point of view.

Still preferably, the main body further comprises a distal flange which the coupling end protrudes from.

Advantageously, this feature provides a stable coupling surface for the orthopaedic prosthesis.

More preferably, the device according to the invention further comprises an adapting spacer, configured to be coupled to the distal flange.

Advantageously, this component allows coupling an orthopaedic prosthesis with different conformation and dimensional features compared to the impactor.

Still preferably, the device according to the invention further comprises an abutting proximal flange, opposite the substantially disc-shaped coupling end to allow a pushing force to be applied onto the device itself.

Advantageously, a surface is therefore provided on which the surgeon can apply, generally with a hammer, the necessary push for the definitive grafting of the orthopaedic prosthesis.

According to a further aspect, the present invention provides for an orthopedic impactor and extractor kit comprising a device as above described and a plurality of adapting spacers which reproduce the geometry of a plurality of orthopedic prostheses in a conjugated form or "in negative".

Therefore, advantageously, it is possible to provide a range of components which, associated with a same impactor device, allows a use on a plurality of applications with different features.

Further features and advantages will become more apparent from the following detailed description of a preferred, but not exclusive, embodiment of the orthopedic impactor and extractor device according to the present invention, with reference to the enclosed figures given by way of non-limiting example.

BRIEF DESCRIPTION OF THE DRAWINGS

In these drawings.

In different figures, the same elements will be indicated with the same reference numbers.

DETAILED DESCRIPTION

With reference to the enclosed figures, reference number 1 globally and schematically indicates a first embodiment of an orthopedic impactor and extractor device according to the present invention, hereinafter indicated, for the sake of brevity, as device 1.

Figure 1:
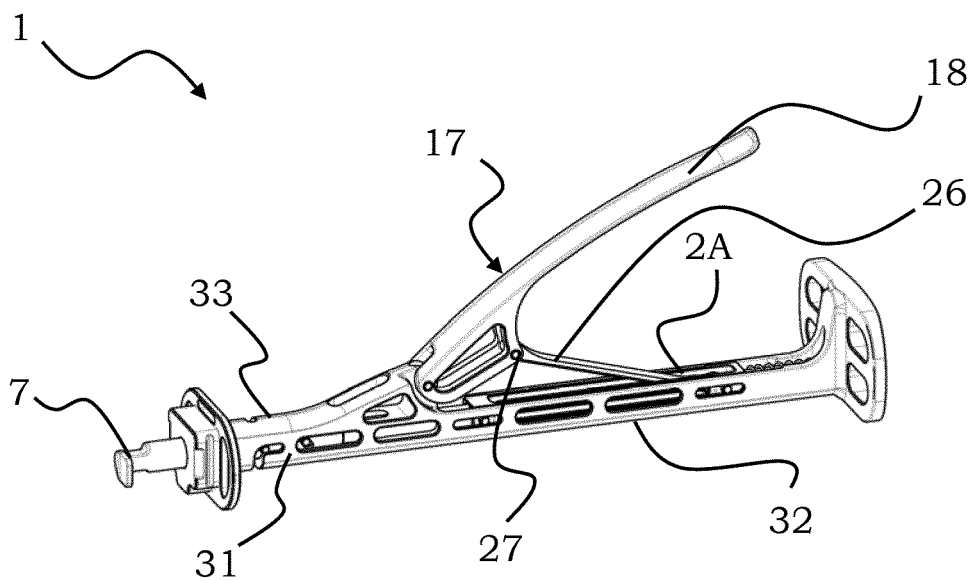
FIG. 1 shows a perspective view of an orthopedic impactor and extractor according to the present invention.
Figure 2:
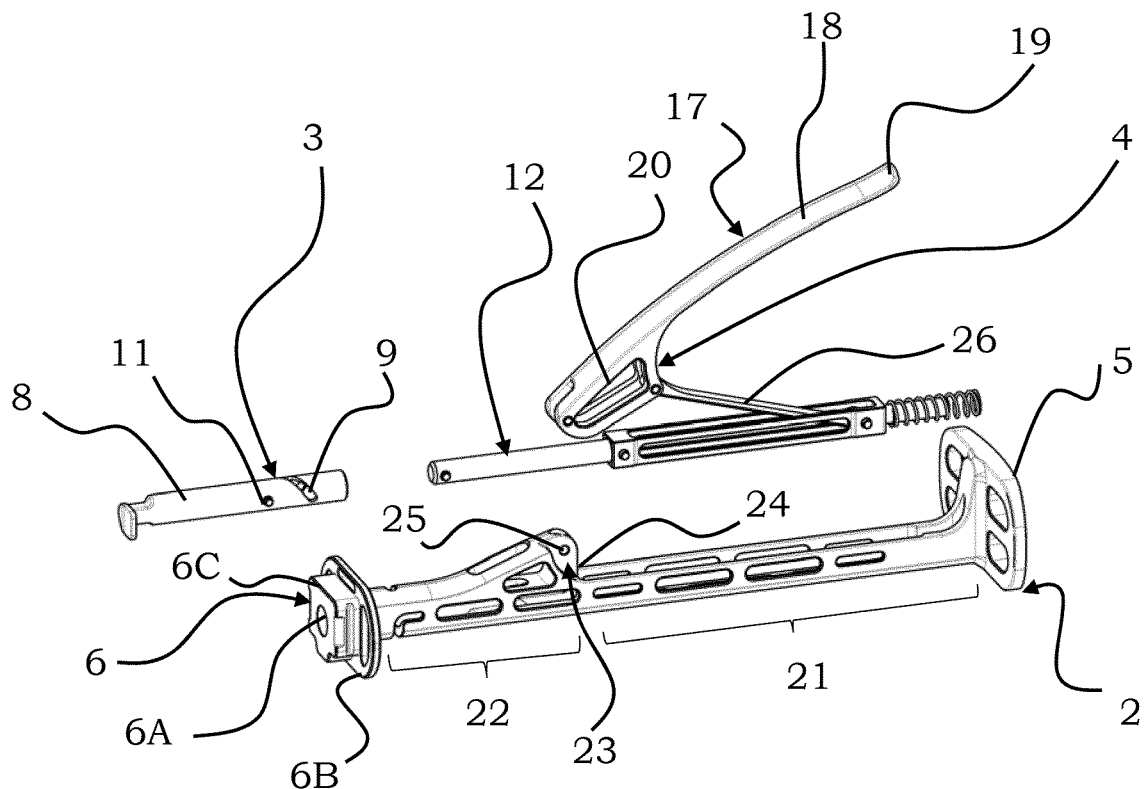
FIG. 2 shows an exploded view of the orthopedic impactor and extractor of FIG. 1.
Figure 3:
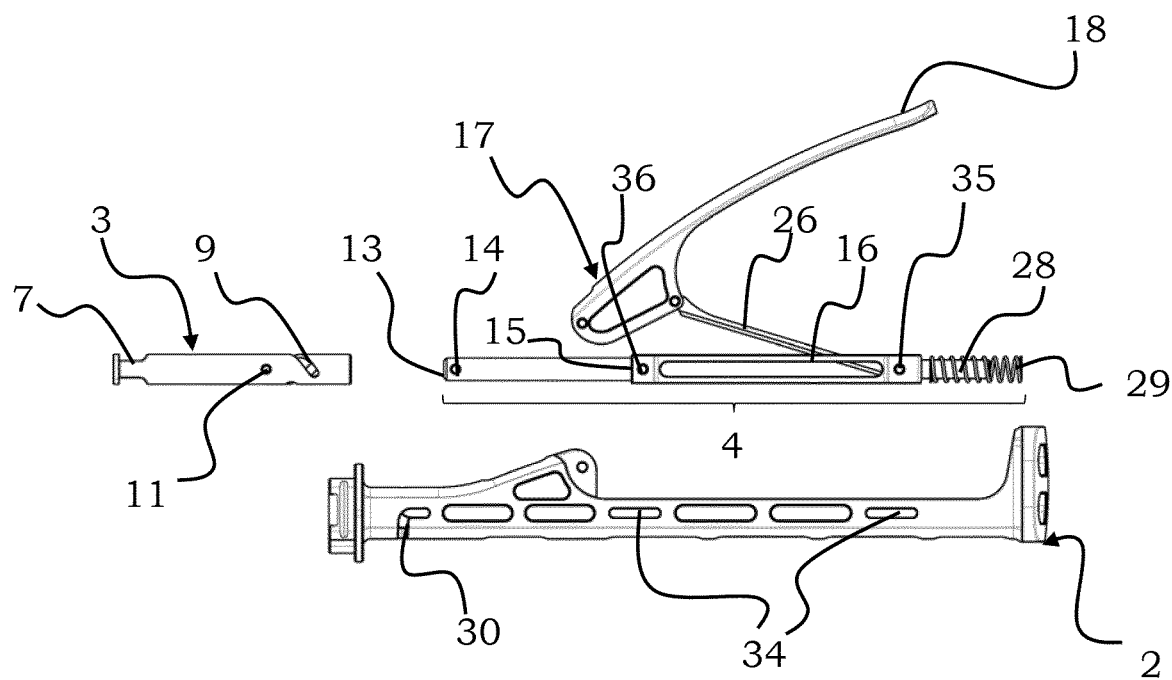
FIG. 3 shows a side view of the orthopedic impactor and extractor of FIG. 1.

Specifically, FIGS. 1-3 show views of an embodiment of the device 1 in an assembled configuration, in a detached-part or "exploded" view and in a side view, respectively.

In the present embodiment, the device 1 comprises a main body 2, a coupling rod 3, and an activation system 4.

The main body 2 is substantially made as a partially grooved beam having an abutting proximal flange 5 and a distal flange 6, at the opposite ends thereof. The main body thus defines a longitudinal housing channel 2A wherein it is housed and the activation system 4 may slide.

In the present description the terms "proximal" and "distal" are referred to a use condition of the device 1 with respect to the surgeon who uses it.

The coupling rod 3 comprises a coupling end 7.

The coupling end 7 protrudes from the distal flange 6, passing through a hole 6A in the centre of the latter.

The distal flange comprises a disc-shaped perimetral portion 6B and a central portion 6C formed so as to ensure a stable coupling surface to an adapting spacer which, as it will be hereinafter described, allows coupling to an orthopaedic prosthesis.

In the present embodiment the coupling end 7 is substantially L-shaped.

More specifically, in the present embodiment the coupling rod 3 has a hollow cylindrical development section.

Close to the distal end of the device 1 there is a section one-way restriction, in other words a flattening of the coupling rod 3, which ends with a portion projecting transversally with respect to the longitudinal development of the coupling rod 3, thus forming the above-mentioned coupling end 7.

Preferably, the coupling end comprises a laterally projecting portion. In the exemplified embodiment, said coupling end is L-shaped. In other alternatives, not represented, the coupling end could be T-shaped, namely with a double laterally projecting portion, or conically linked with at least one laterally projecting portion.

In general, the coupling end is configured to selectively couple to the orthopaedic prosthesis and to selectively release the orthopaedic prosthesis.

Furthermore, on a lateral surface 8 of the coupling rod 3 a first helical groove 9 is provided, which develops from a proximal section 10A to a distal section 10B in a kind of screwing along the lateral surface 8, which are more visible in the following FIGS. 11 and 12.

Moreover, on the lateral surface 8 a second pin 11, projecting from said lateral surface 8, is provided.

The functions of the first helical groove 9 and of the second pin 11 will become more apparent hereinafter.

The activation system 4 comprises a push rod 12.

The push rod 12 is shaped with a specular section with respect to the coupling rod 3.

In the present embodiment, the push rod 12 is thus shaped as a solid cylindrical section, the coupling rod 3 being thus adapted to be cap-fitted onto said push rod 12.

Close to an own distal end 13, the push rod 12 comprises a first pin 14.

The first pin 14 is adapted to slide along the first helical groove 9 to guide a rotation of the coupling end 7.

Nothing prevents from providing different solutions, for instance a dual configuration with a groove that is provided on the push rod 12 and a pin projecting toward the inside of the coupling rod 3 that has a hollow cylindrical shape, or other corresponding solutions, all within the scope defined by the appended claims.

The push rod 12 is connected and coaxial to a slide portion 16 at the end 15 opposite the coupling rod 3.

Inside the slide portion 16 a lever tool 17, whereonto the surgeon acts to activate the device 1, slides.

The lever tool 17 comprises a force lever 18, whereonto the surgeon applies a release or compressive force away from and toward the main body 1 depending on the operation phase of the device according to the invention.

The force lever 18 is defined between a free end 19 and an opposite eye portion 20.

In the present embodiment, as stated, the main body 2 is shaped as a partially grooved beam, with a first hull-shaped tract 21 from the abutting proximal flange 5 and a second hollow-duct tract 22.

At the intersection between the first tract 21 and the second tract 22, the latter provides for a bump-portion 23.

At said bump-portion 23 a connection plate 24, arranged according to the longitudinal symmetry surface of the device 1, is obtained.

The eye portion 20 of the force lever 18 is connected to the connection plate 24 by a first connection hinge 25.

Furthermore, the eye portion 20 is connected to a leaf spring 26 by a second connection hinge 27, said leaf spring 26 sliding in the slide portion 16 and allowing the back and forth push of the push rod 12.

Finally, the activation system 4 comprises an end rod 28 connected and coaxial to the slide portion 16 and wrapped by a spring member 29.

Figure 6:
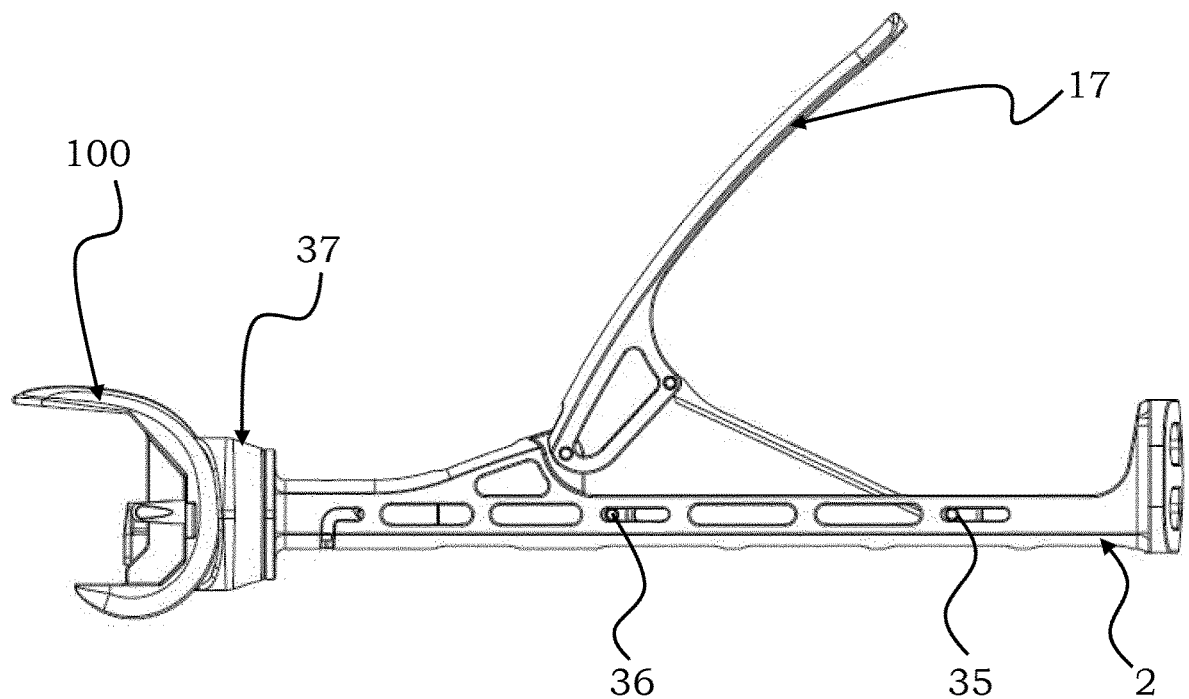
FIG. 6 shows a side view of the orthopedic impactor and extractor of FIG. 3 with a lever tool in an inactive position.
Figure 8:
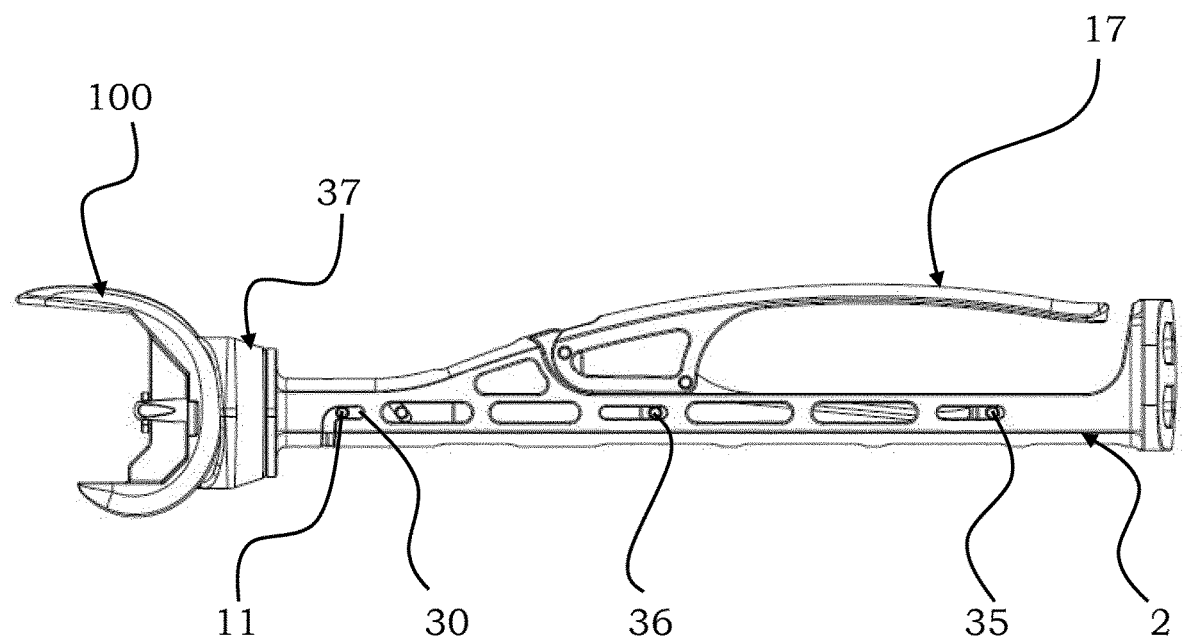
FIG. 8 shows a side view of the orthopedic impactor and extractor of FIG. 3 with the lever tool in an active position.
Figure 9:
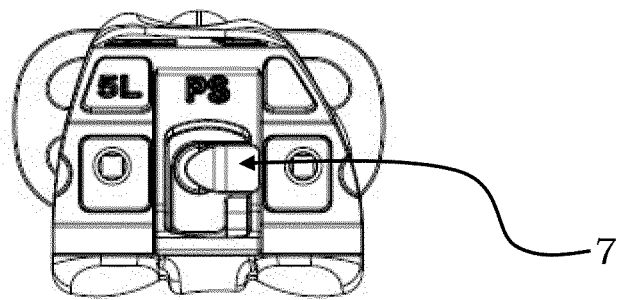
FIG. 9 shows a frontal view of the orthopedic impactor and extractor of FIG. 3 with the lever tool in an active position.

The spring member 29 contributes maintaining the lever tool 17 in a completely open inactive position, exemplified in FIG. 6, or in a completely closed active position, exemplified in FIG. 8.

The elastic force of the spring member 29 is negligible in the use of the device 1.

The main body 2 further comprises a second L-shaped groove 30, formed close to the distal flange 6 on a lateral wall 31 of the main body 2 itself.

In the present embodiment a specular second L-shaped groove 30 is formed even at the opposite lateral wall 33.

The second L-shaped groove 30 extends first horizontally toward the distal flange 6 and then toward a bottom 32 of the main body 2.

The second pin 11 is adapted to slide in the second L-shaped groove 30 to guide a longitudinal movement of the coupling end 7.

In the present embodiment the second pin 11 passes through the coupling rod 3 and thus protrudes from two sides of the lateral surface 8, thus sliding along the second L-shaped groove 30 at the lateral wall 31 and along the specular one at the opposite lateral wall 33.

However, it may be sufficient to adopt a single second L-shaped groove 30 at a single lateral wall 31 or 33 and a second pin 11 protruding just from one side of the lateral surface 8.

Further grooves are then obtained along the side wall 31 and along the opposite side wall 33 along the longitudinal development of the device 1.

In two pairs of lateral recesses 34 between said grooves, a first alignment pin 35 which is transversal with respect to the longitudinal development of the device 1 and with which the leaf spring 26 is coupled to the slide portion 16, and a second alignment pin 36 which is transversal with respect to the longitudinal development of the device 1 and with which the push rod 12 is coupled to the slide portion 16, slide.

The first alignment pin 35 and the second alignment pin 36 assure the longitudinal sliding, without unwanted lateral movements of the entire activation system 4.

The remaining lateral grooves, made in an analogical way, only act as a lightening for the overall device 1.

Figure 4:
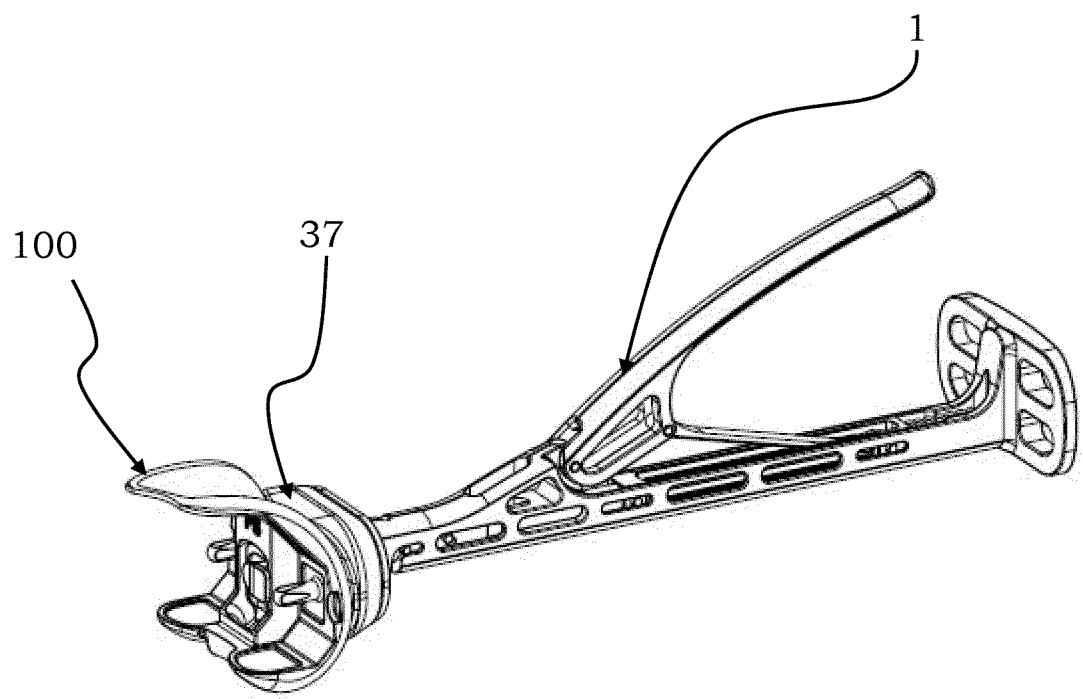
FIG. 4 shows a perspective view of an orthopedic impactor and extractor according to the present invention comprising a coupling spacer and coupled to an orthopaedic prosthesis.
Figure 5:
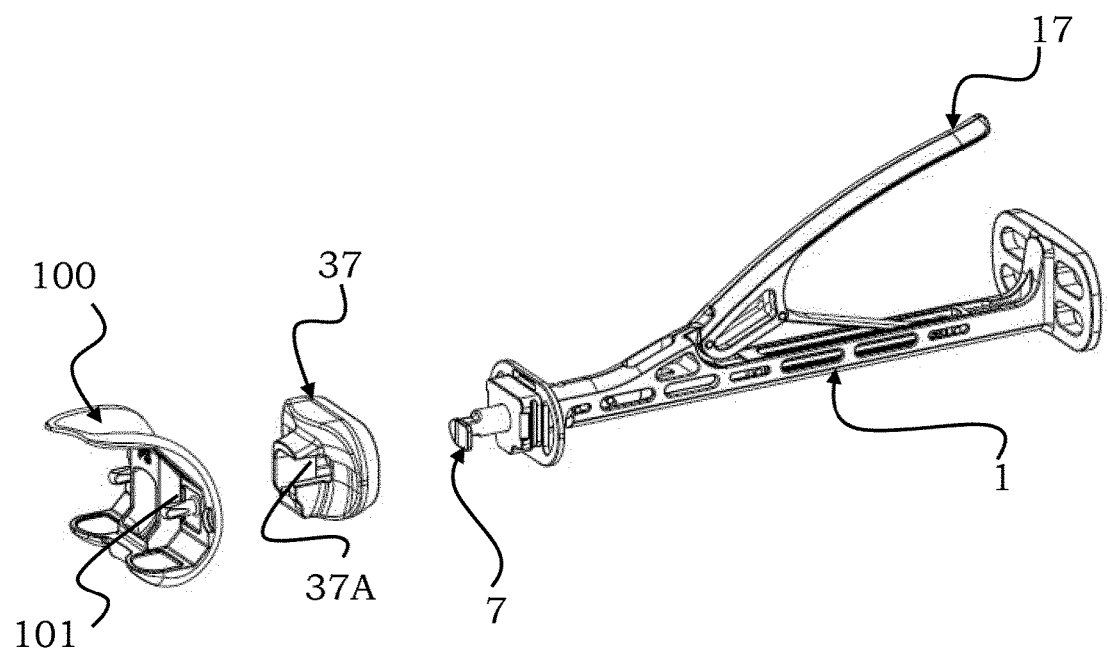
FIG. 5 shows an exploded view of the orthopedic impactor and extractor of FIG. 3.

As visible in FIGS. 4 and 5, the device 1 is connectable to an orthopaedic prosthesis 100 which, as already mentioned, is also called femoral component.

The orthopaedic prosthesis 100 is generally provided with a through-hole 101.

Said through-hole 101 is used to create a coupling with the device 1 by adopting the coupling end 7.

Often, there are orthopedic prostheses of various sizes, and it is not practical to provide a device 1 with a relative distal flange 6 suitable for each group of orthopedic prostheses.

Therefore, the device 1 further comprises an adapting spacer 37 that allows coupling an orthopaedic prosthesis 100, having different shape and dimensional features compared to the device 1, to the related distal flange 6.

According to a further aspect, the present invention also provides for a kit (not shown) comprising a device 1 and a plurality of adapting spacers 37 which reproduce the geometry of a plurality of orthopedic prostheses 100 in a conjugated form or "in negative".

The adapting spacer 37 has a through-hole 37A mating with the through-hole 101 of the orthopaedic prosthesis 100.

Figure 17:
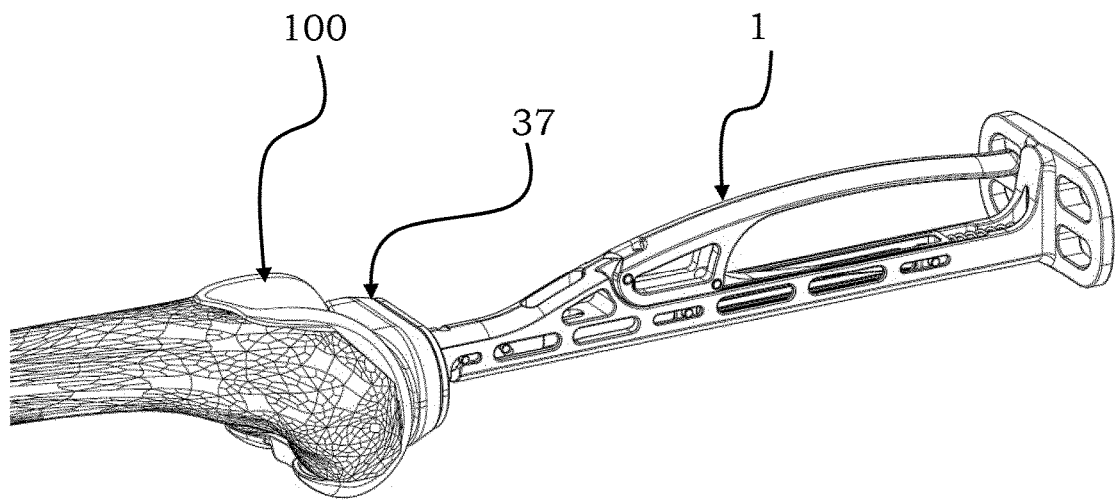
FIGS. 17 and 18 show perspective schematic views of an orthopedic impactor during the grafting of an orthopaedic prosthesis at a distal portion of the femur.
Figure 18:
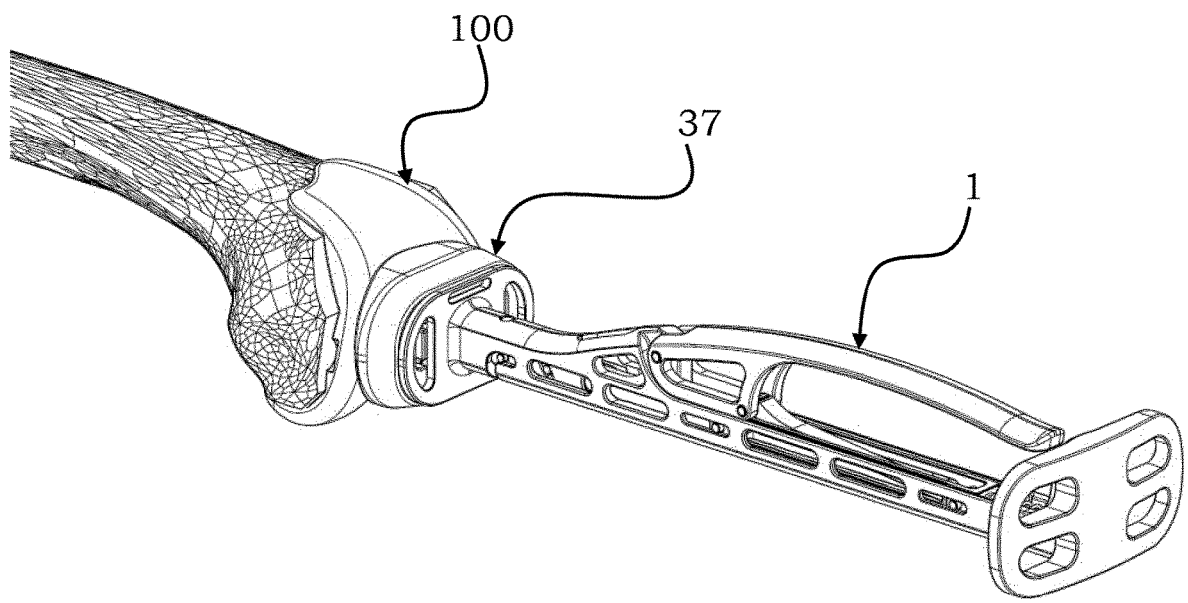

As stated, in a position opposite the distal flange 6 the abutting proximal flange 5, formed to allow an impulsive pushing force to be applied onto the entire device 1, generally by means of a hammer tool, and so to graft the orthopaedic prosthesis 100, as visible in the following FIGS. 17 and 18, is present.

As visible in FIGS. 6 to 10, the device 1 passes from an inactive position to an active position and vice versa.

Figure 7:
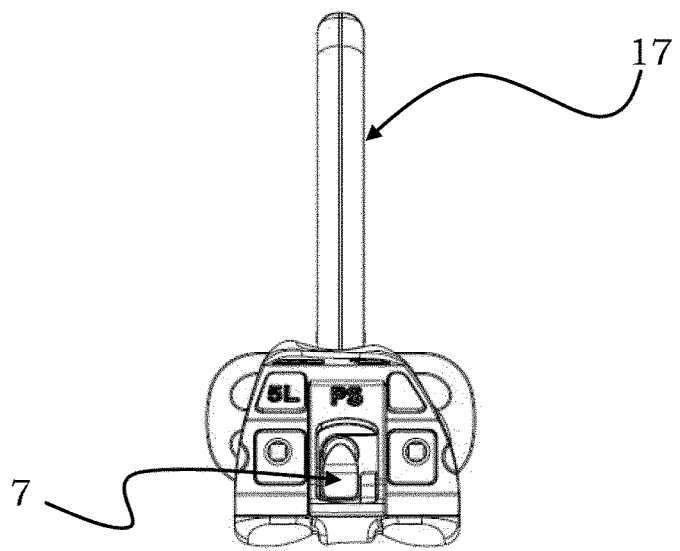
FIG. 7 shows a frontal view of the orthopedic impactor and extractor of FIG. 3 with the lever tool in an inactive position.

In FIGS. 6 and 7 it is possible to see how, when the force lever 18 of the activation system 4 is raised, the coupling end 7 is in the inactive position, with the projecting portion of the coupling end 7 facing towards the bottom 31 of the device 1. In said position, in a femoral application, said projecting portion is parallel to the femoral condyles.

In this position the coupling end 7 may pass through the through-hole 101 of the orthopaedic prosthesis 100 and, if present, through the through-hole 37A of the adapting spacer 37.

Bringing the force lever 18 to the lowered position and substantially parallel to the longitudinal development of the main body 2, the coupling end 7 is movably guided in an active position, i.e. rotated with respect to the inactive position, in which the orthopaedic prosthesis 100 is integral with the device 1.

Vice versa, once the prosthesis has been placed 100, the coupling end 7 is moved from the active position to the inactive position, thus releasing the orthopaedic prosthesis 100.

In the represented embodiment, the coupling end 7 rotates by 90° between the active position and the inactive position.

Figure 10:
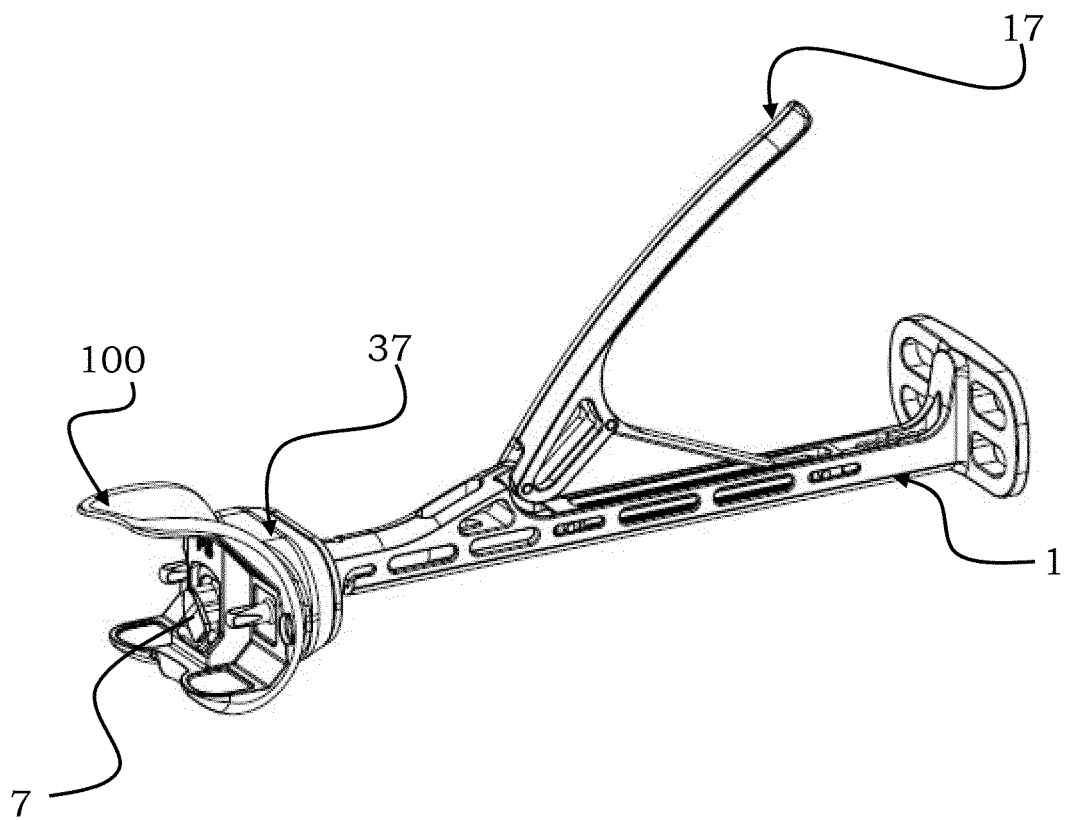
FIG. 10 shows a perspective view of the orthopedic impactor and extractor with a coupling end in an intermediate position.

However, it is clear, even looking at FIG. 10 in which an intermediate phase of the passage between inactive position and active position is represented, that even a different rotation could allow locking the orthopaedic prosthesis 100 and, if present, the adapting spacer 37 on the distal flange 6 of the device 1.

In other words, the orientation of the coupling end 7 is parallel to the condyles with the lever tool 17 open.

By closing the lever tool 17, the coupling end 7 rotates by 90° without (or almost without) approaching the orthopaedic prosthesis 100, approaches the orthopaedic prosthesis 100 without rotation and fixes the orthopaedic prosthesis 100.

Figure 11:
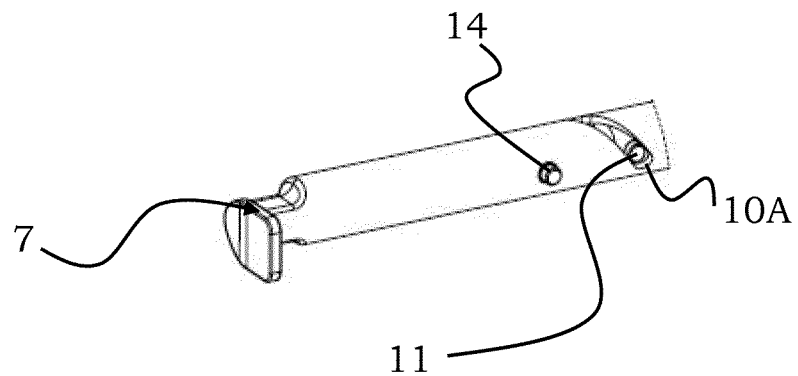
FIG. 11 shows a detail of a coupling end in an inactive position.
Figure 12:
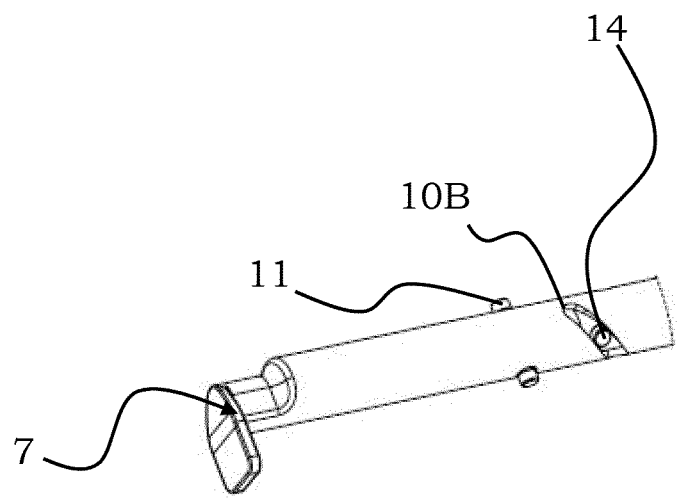
FIG. 12 shows a detail of a coupling end in an intermediate position.

Therefore, there is a roto-translation in two phases, at first a rotation that is obtained through the sliding of the first pin 14 in the first helical groove 9, as visible in detail in FIGS. 11 and 12, and then a locking of the prosthesis 100 that is integral with the device 1.

However, nothing prevents from using a different shape of the grooves to obtain simultaneous rotation and translation, for instance replacing the L-shaped groove 30 with an arch groove, the present alternative being included within the scope of protection defined in the appended claims.

The operation of the device 1 coupling to an orthopaedic prosthesis 100 will now be described in detail with particular reference to FIGS. 13-16.

Figure 13:
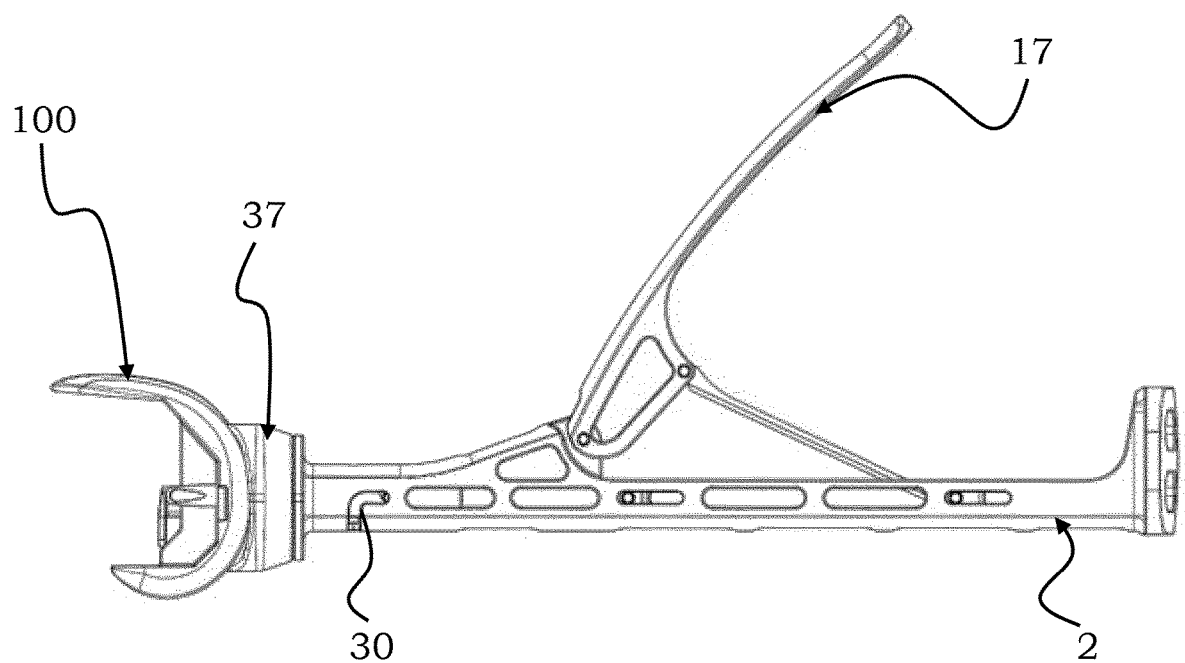
FIG. 13 shows a first use phase of an orthopedic impactor and extractor according to the present invention.

In FIG. 13 the force lever 18 of the lever tool 17 of the activation system 4 is raised, the second pin 11 is at the bottom 32 of the device 1 and the first pin 14 is at the distal end 10B of the first helical groove 9.

Figure 14:
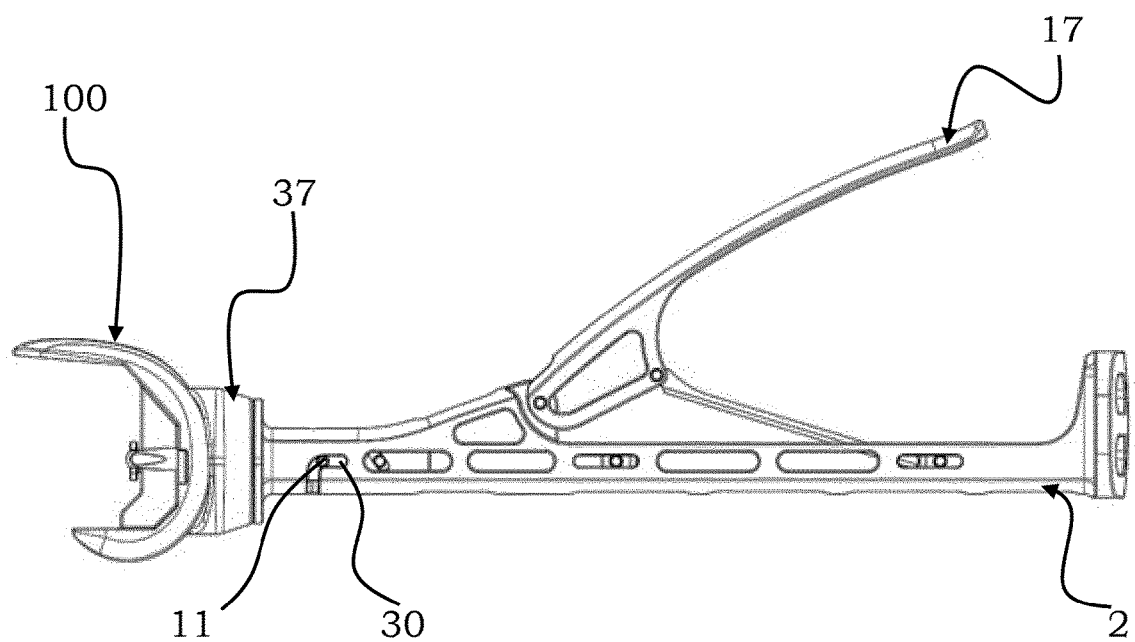
FIG. 14 shows a second use phase of an orthopedic impactor and extractor according to the present invention.

Closing by a first amplitude, as visible in FIG. 14, the slide portion 16 is pushed backwards by means of the leaf spring 26.

The first pin 14 runs the path of the first helical groove 9 from the distal section 10B toward the proximal section 10A, whereas the second pin 11 runs the vertical tract of the L-shaped groove 30. This tract may also be slightly tilted to facilitate the movement.

In this way the coupling end 7 rotates, in this 90° exemplifying and non-limiting embodiment, without longitudinal translation (or almost without translation in case of a slightly tilted tract) of the coupling rod 3.

Figure 15:
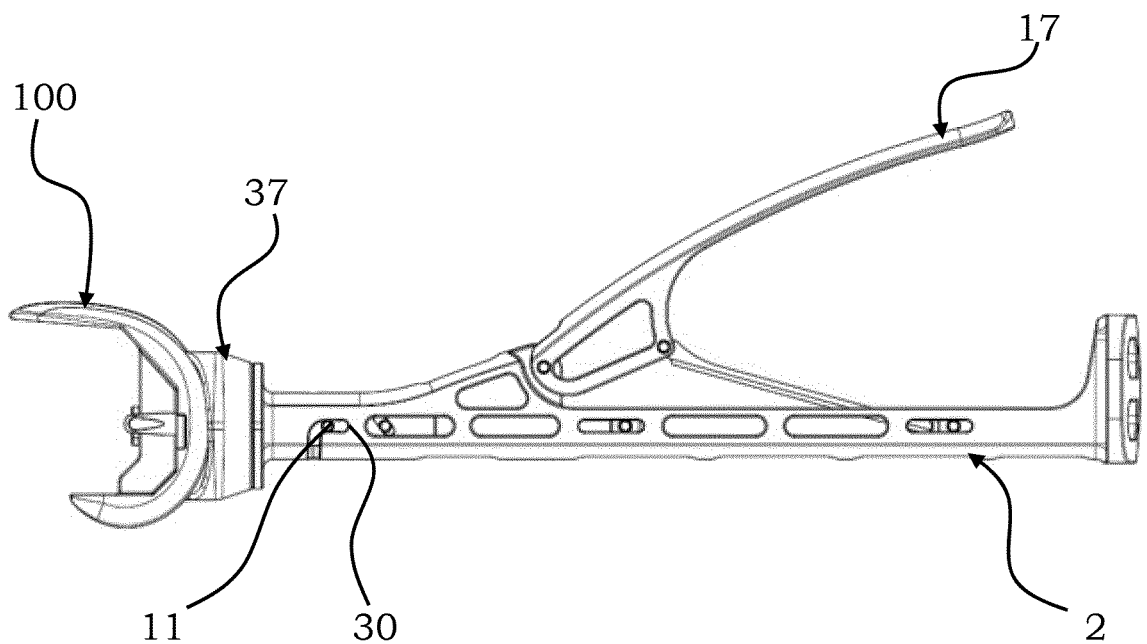
FIG. 15 shows a third use phase of an orthopedic impactor and extractor according to the present invention.
Figure 16:
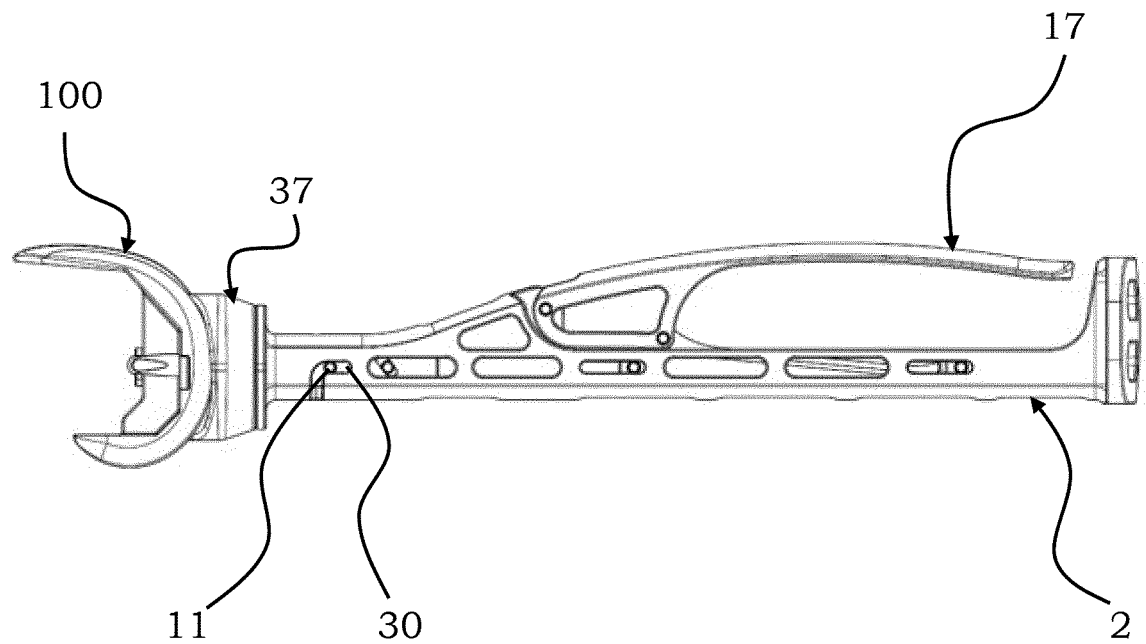
FIG. 16 shows a fourth use phase of an orthopedic impactor and extractor according to the present invention.

By continuing to close the lever tool 17, as visible in FIGS. 15 and 16, the coupling end 7 in a rotated and thus active position, is first brought close to the orthopaedic prosthesis 100 and then tightened thereto, so that the orthopaedic prosthesis 100 is integral with the device 1. In this phase the second pin 11 runs along the horizontal tract of the second L-shaped groove 30.

The passage between the vertical tract and the horizontal tract of the second L-shaped groove 30 is generally connected to facilitate the movement.

The tightening of the orthopaedic prosthesis 100, in particular on the distal flange 6, occurs since, when the coupling end 7 of the coupling rod 3 comes into contact with the orthopaedic prosthesis 100, continuing to close the lever tool 17, the slide element 16 can no longer translate backwards and the leaf spring compresses 26.

The compression force of the leaf spring 26 is transmitted, through the slide element 16, to the coupling rod 3, which presses the orthopaedic prosthesis 100 against the adapting spacer 37, if present, or onto the orthopaedic prosthesis 100 itself, if the adapting spacer 37 is not present, keeping it in position.

Instead, as anticipated, the spring member 29 wrapped around the end rod 28 only provides help in maintaining the lever tool 17 in position and facilitating the possible insertion of the adapting spacer 37, but the elastic force of the spring member 28 is negligible in the use of the device 1.

When the orthopaedic prosthesis 100 is integral with the device 1, the surgeon inserts the orthopaedic prosthesis 100, fixes it in position by applying a force, generally by a hammer tool with which it hits the abutting proximal flange 5.

Afterwards the surgeon brings the lever tool 17 back to the open position, resulting in a reverse path of the first pin 14 and of the second pin 11, with the device 1 releasing the orthopaedic prosthesis 100 and being decoupled therefrom.

Advantageously, the simple activation of the lever tool 17 is transferred with a complex movement of the coupling end thus allowing the surgeon an easy and ergonomic use and also a simple insertion compared to a system without rotation.

Still advantageously, the device 1 according to the invention also ensures, along with the ease of use, the accuracy of the prosthesis grafting thanks to the precise guide of each component in operation.

Moreover, the device 1, compared to the prior art tools, reduces the amounts of space during the insertion, providing a more compact, less invasive, and overall lighter solution.

Finally, the device 1 is intuitive to use and does not require any particular additional skills to be acquired by surgeons.

The person skilled in the art will appreciate that the present embodiment may be subjected to further changes and variations, according to specific and contingent needs, all included within the scope of protection of the invention, as defined by the following claims.

For instance, nothing prevents from providing alternative solutions as the above suggested ones of dual or "mirror"

solutions in the arrangement of pins and grooves for moving the coupling end 7, or different shapes of the grooves themselves to generate a roto-translation effect.

It is further possible to provide an alternative activation system which provides a piston activation through the proximal flange to obtain the sliding of the coupling rod 3.

The use of a plurality of materials is also provided, according to the specific needs, provided they are sterile and suitable for a surgical application.

What is claimed is:

1. An orthopaedic impactor and extractor device for an orthopaedic prosthesis, said orthopaedic impactor and extractor device comprising:
   a main body;
   a coupling rod comprising a coupling end;
   an activation system in the main body, said activation system being associated with said coupling rod, wherein said coupling end is movably guided from an active position in which said coupling end is coupled to said orthopaedic prosthesis to an inactive position in which said coupling end releases said orthopaedic prosthesis;
   and wherein said coupling end is movably guided in a continuous roto-translation movement between said active position and said inactive position, and vice versa.

2. The orthopaedic impactor and extractor device according to claim 1, wherein said coupling end is configured to continuously rotate between said inactive position and said active position.

3. The orthopaedic impactor and extractor device according to claim 2, wherein said coupling end comprises a laterally projecting portion.

4. The orthopaedic impactor and extractor device according to claim 1, wherein said activation system comprises:
   a push rod;
   a slide portion connected and coaxial to said push rod;
   an end rod connected and coaxial to said slide portion and wrapped in a spring member;
   a lever tool.

5. The orthopaedic impactor and extractor device according to claim 4, wherein said lever tool comprises a force lever and a leaf spring, connected to said force lever and sliding in said slide portion.

6. The orthopaedic impactor and extractor device according to claim 4, wherein said coupling rod comprises a first helical groove at a lateral surface thereof, and wherein said push rod comprises a first pin configured to slide along said first helical groove to guide a rotation of said coupling end.

7. The orthopaedic impactor and extractor device according to claim 6, wherein said main body further comprises at least one second L-shaped groove and wherein said coupling rod comprises a second pin configured to slide along said at least one second L-shaped groove to guide a longitudinal movement of said coupling end.

8. The orthopaedic impactor and extractor device according to any one of claim 4, wherein said main body further comprises lateral recesses,
   wherein a leaf spring is coupled to said slide portion by a first alignment pin and wherein said push rod is coupled to said slide portion by a second alignment pin,
   said first alignment pin and second alignment pin being configured to slide in said lateral recesses.

9. The orthopaedic impactor and extractor device according to any one of previous claim 1, wherein said main body comprises a longitudinally partially grooved beam comprising a longitudinal housing channel for said activation system.

10. The orthopaedic impactor and extractor device according to any one of previous claim 1, wherein said main body further comprises a distal flange, said coupling end protruding from said distal flange.

11. The orthopaedic impactor and extractor device according to claim 10, further comprising an adapting spacer configured to be coupled to said distal flange.

12. The orthopaedic impactor and extractor device according to any one of previous claim 1, further comprising an abutting proximal flange opposite to said coupling end and substantially disc-shaped to allow a pushing force to be applied onto said orthopaedic impactor and extractor device.

13. An orthopaedic impactor and extractor kit comprising:
   an orthopaedic impactor and extractor device comprising:
      a main body;
      a coupling rod comprising a coupling end;
      an activation system in the main body, said activation system being associated with said coupling rod;
   wherein said coupling end is movably guided from an active position in which said coupling end is coupled to an orthopaedic prosthesis, to an inactive position in which said coupling end releases said orthopaedic prosthesis;
   and wherein said coupling end is movably guided in a continuous roto-translation movement between said active position and said inactive position, and vice versa; and
   a plurality of adapting spacers reproducing in a conjugated form the geometry of a plurality of orthopaedic prostheses.

* * * * *